US009651669B2

(12) United States Patent
Cho et al.

(10) Patent No.: US 9,651,669 B2
(45) Date of Patent: May 16, 2017

(54) METHOD FOR DETECTING ANOMALY SATELLITE IN MULTI-REFERENCE STATIONS ENVIRONMENT AND APPARATUS USING DETECTING METHOD

(71) Applicant: KOREA INSTITUTE OF OCEAN SCIENCE AND TECHNOLOGY, Gyeonggi-do (KR)

(72) Inventors: Deuk Jae Cho, Gyeonggi-do (KR); Mi Young Shin, Gyeonggi-do (KR)

(73) Assignee: KOREA INSTITUTE OF OCEAN SCIENCE AND TECHNOLOGY, Ansan-si (KR)

( * ) Notice: Subject to any disclaimer, the term of this patent is extended or adjusted under 35 U.S.C. 154(b) by 314 days.

(21) Appl. No.: 14/238,841

(22) PCT Filed: Aug. 9, 2013

(86) PCT No.: PCT/KR2013/007179
§ 371 (c)(1),
(2) Date: Feb. 13, 2014

(87) PCT Pub. No.: WO2014/027797
PCT Pub. Date: Feb. 20, 2014

(65) Prior Publication Data
US 2014/0240171 A1    Aug. 28, 2014

(30) Foreign Application Priority Data

Aug. 13, 2012  (KR) .................. 10-2012-0088406

(51) Int. Cl.
*G01S 19/13* (2010.01)
*G01S 19/08* (2010.01)
*G01S 19/20* (2010.01)

(52) U.S. Cl.
CPC .............. *G01S 19/13* (2013.01); *G01S 19/08* (2013.01); *G01S 19/20* (2013.01)

(58) Field of Classification Search
CPC ........... G01S 19/13; G01S 19/08; G01S 19/20
USPC ....................................... 342/357.51, 357.58
See application file for complete search history.

(56) References Cited

U.S. PATENT DOCUMENTS

| | | | | |
|---|---|---|---|---|
| 8,624,779 B2* | 1/2014 | Ferguson | ................ | G01S 19/04 342/357.58 |
| 8,878,720 B2* | 11/2014 | Ono | ........................ | G01S 19/07 342/357.23 |
| 2006/0267836 A1* | 11/2006 | Bird | ........................ | G01S 19/04 342/357.41 |
| 2010/0039320 A1 | 2/2010 | Boyer et al. | | |
| 2011/0115669 A1* | 5/2011 | Milyutin | ................ | G01S 19/20 342/357.27 |
| 2013/0009817 A1* | 1/2013 | Savoy | ..................... | G01S 19/20 342/357.58 |

(Continued)

FOREIGN PATENT DOCUMENTS

| | | |
|---|---|---|
| JP | 2010-210436 | 9/2010 |
| JP | 2010-281667 | 12/2010 |
| KR | 10-1040054 | 6/2011 |

*Primary Examiner* — Marcus Windrich
(74) *Attorney, Agent, or Firm* — Adam Warwick Bell; Matthew Rupert Kaser (57) ABSTRACT

The present invention relates to an apparatus and a method for identifying an anomalous satellite in a multi-reference station environment.

19 Claims, 7 Drawing Sheets

(56) References Cited

U.S. PATENT DOCUMENTS

2014/0097984 A1* 4/2014 Stevens ............... G01S 19/20
 342/357.58
2014/0232595 A1* 8/2014 Rife .................... G01S 19/20
 342/357.58

* cited by examiner

METHOD FOR DETECTING ANOMALY SATELLITE IN MULTI-REFERENCE STATIONS ENVIRONMENT AND APPARATUS USING DETECTING METHOD

TECHNICAL FIELD

The present invention relates, in general, to a method of determining an anomalous satellite and a determination apparatus using the method and, more particularly, to a method of determining an anomalous satellite in a multi-reference station environment and a determination apparatus using the method, which detect an anomaly in a satellite and determine the cause of the anomaly in a multi-reference station environment having at least three reference stations, and which continuously provide services in an environment in which the cause of the anomaly is removed, thus improving availability and continuity, and enhancing an integrity monitoring function.

BACKGROUND ART

A Global Positioning System (GPS), which is a global navigation satellite system developed and promoted by U.S. Department of Defense (DOD), is essentially used in terrestrial, marine, and aerial fields for safe navigation. Such a GPS is also designated as a NAVSTAR/GPS from the standpoint of a system which uses a Navigation System with Time And Ranging (NAVSTAR) which is a navigation satellite system for medium/high orbits.

Such a GPS is composed of a total of 24 navigation satellites launched in groups of four satellites to six circular orbits having an altitude of 20,000 km, a period of about 12 hours, and an orbital inclination angle of 55 degrees, a ground control station for managing the satellites, and each user receiver.

Service interruption caused by the failure of a Global Navigation Satellite System (GNSS) may interfere with marine, aerial, and terrestrial traffic services, thus resulting in problems such as economic loss. Therefore, during the provision of a GNSS service, there is a need to execute Integrity Monitoring (IM) for a user.

Network Real Time Kinematic (RTK), which is augmentation technology based on the carriers of multiple reference stations, has been mainly utilized in geodetic survey fields requiring centimeter-level positioning performance in an early stage, but has recently evolved into technology aiming at improving positioning performance in dynamic systems, such as Intelligent Transportation Systems (ITS), precision approach, and harbor navigation systems.

Technology aiming at improving accuracy which is considered to be important in geodetic survey fields has been continuously executed, but technology related to integrity, continuity, and availability, which are other performance request elements required to be utilized in application fields for positioning, is still insufficient.

In dynamic systems aiming at positioning, technology for integrity, continuity, and availability, in addition to accuracy, is required so as to actually implement and apply network RTK.

The causes of anomalies in a GPS satellite may include anomalies in satellite clocks, anomalies in satellite orbits, anomalies in navigation messages, etc., and such anomalies in the GPS satellite increase an error in the pseudo-range of the corresponding satellite, exhibit an instable state in code and carrier phase measurements, and cause discontinuous points, thus resulting in which a positioning error increases.

From the standpoint of a user, there is a problem in that a known anomaly in a GPS satellite may be replaced, but the stability of a positioning service is deteriorated in the case of an unknown anomaly, thus making it impossible to provide the service.

Conventional technologies capable of determining whether an anomaly occurs on a satellite include a Receiver Autonomous Integrity Monitoring (RAIM) technique used by a single user receiver, Reference Station and Integrity Monitors (RSIM) operated by a Differential GPS (DGPS), a 3-QM (Quality Monitoring) technique operated by a Local Area Augmentation System (LAAS), etc.

The RAIM technique independently used by a single user receiver itself includes a method of comparing pseudo-ranges and position solutions, a method of comparing the maximum separation distances of navigation solutions, a method using parity vectors, etc. Most of these methods have the concept of determining the presence or non-presence of anomalies using redundant measurements, and are problematic in that there are many restrictions in use and reliability is low.

Further, as disclosed in "development report for a dual frequency receiver for DGPS reference stations (in 2006, Ministry of Maritime Affairs and Fisheries, Sang-Hyeon Seo et al.)," RSIM operated by DGPS is intended to guarantee the integrity of generated code-based correction information, and is capable of analyzing a difference between a measured pseudo-range and a predicted pseudo-range using characteristics that the location of the receiver of a DGPS reference station is exactly known, and is then determining whether an anomaly is present.

Such a determination method can individually detect the presence or non-presence of anomalies in all observed satellites, but is problematic in that code measurements are used, and required performance is low, and thus it is not suitable for application to network RTK.

Further, 3-QM operated by LAAS is chiefly divided into signal QM (SQM) for examining signal anomalies caused by a GPS satellite and a sudden variation in the ionosphere occurring during a radio wave propagation, data QM (DQM) for examining an error in navigation messages, and Measurement QM (MQM) for examining the measurements of the receiver, wherein SQM mainly aims at detecting an Evil Waveform (EWF), signal power errors, and ionospheric divergence. In order to apply such SQM, a procedure for re-designing a receiver in conformity with the necessity thereof is required.

DQM mainly aims at detecting code errors, bit errors in navigation signals, and errors in orbital information, and MQM mainly aims at detecting errors in code and carrier phase measurements, and performs filter divergence examination, measurement variation examination, sigma value examination, and B-value examination. 3-QM is a method of normalizing specifications and performance so that it is suitable for an LAAS system.

Therefore, even in a network RTK environment, the development and application of a suitable anomaly monitoring processing technique are currently required.

DISCLOSURE

Technical Problem

Accordingly, the present invention has been made keeping in mind the above problems, and an object of the present invention is to provide a method of determining an anomalous satellite in a multi-reference station environment and a determination apparatus using the method, which can detect the anomaly state of a satellite and identify an anomalous satellite in a multi-satellite reference station environment and can determine the cause of the anomalous satellite, as technology for securing integrity in a network Real Time Kinematic (RTK) environment.

Another object of the present invention is to provide a method of determining an anomalous satellite in a multi-reference station environment and a determination apparatus using the method, which detect an anomaly in a satellite and determine the cause of the anomaly in a multi-reference station environment having at least three reference stations, and which continuously provide a service in an environment in which the cause of the anomaly is removed, thus improving availability and continuity and enhancing an integrity monitoring function.

The object of the present invention is not limited to the above-described objects, and other objects, not described here, may be definitely understood by those skilled in the art from the following description.

Technical Solution

In order to accomplish the above objects, a method of determining an anomalous satellite in a multi-reference station environment according to the present invention includes a first step of a satellite signal reception unit individually receiving satellite signals including code measurements and carrier measurements from one or more reference stations respectively communicating with a plurality of satellites, a second step of a reference station number determination unit checking a number of reference stations communicating with the plurality of satellites, based on the satellite signals, a third step of an anomaly state detection unit detecting presence or non-presence of an anomaly state of the satellites, based on the code measurements and the carrier measurements of the satellite signals, and a fourth step of an anomalous satellite identification unit identifying an anomalous satellite from the anomaly state of the satellites detected at the third step, wherein the third step and the fourth step are sequentially repeated a number of times identical to the number of reference stations checked at the second step.

Advantageous Effects

The method of determining an anomalous satellite in a multi-reference station environment and the determination apparatus using the method according to the present invention are advantageous in that the present invention can detect the anomaly state of a satellite and identify an anomalous satellite in a multi-satellite reference station environment and can determine the cause of the anomaly of the anomalous satellite, as technology for securing integrity in a network Real Time Kinematic (RTK) environment.

Further, the present invention is advantageous in that it can detect an anomaly in a satellite and determine the cause of the anomaly in a multi-reference station environment having at least three reference stations, so that a service can be continuously provided in an environment in which the cause of the anomaly is removed, thus improving availability and continuity and enhancing an integrity monitoring function.

BEST MODE

A method of determining an anomalous satellite in a multi-reference station environment according to an embodiment of the present invention is characterized in that it includes a first step of a satellite signal reception unit individually receiving satellite signals including code measurements and carrier measurements from one or more reference stations respectively communicating with a plurality of satellites, a second step of a reference station number determination unit checking a number of reference stations communicating with the plurality of satellites, based on the satellite signals, a third step of an anomaly state detection unit detecting presence or non-presence of an anomaly state of the satellites, based on the code measurements and the carrier measurements of the satellite signals, and a fourth step of an anomalous satellite identification unit identifying an anomalous satellite from the anomaly state of the satellites detected at the third step, wherein the third step and the fourth step are sequentially repeated a number of times identical to the number of the reference stations checked at the second step.

The method of determining the anomalous satellite in the multi-reference station environment method according to the present invention is characterized in that it may further include, if the number of the reference stations checked at the second step is at least 3, a fifth step of an anomaly cause determination unit determining a cause of an anomaly in the anomalous satellite identified at the fourth step.

Further, the method of determining the anomalous satellite in the multi-reference station environment method according to the present invention is characterized in that the third step includes a process of dividing n satellite groups, each having (n−1) satellites, into small satellite groups, and generating estimation operation vectors ($G^i$) for code measurement residuals (g_PR) and carrier measurement residuals (g_CP) of the respective small satellite groups, a process of individually generating estimation operation vectors (M) for measurement residuals from the estimation operation vectors ($G^i$), a process for individually generating parity space vectors (p) from the residual estimation operation vectors (M), a process for individually calculating anomaly possibility indices ($B_{fd}$) using the parity space vectors, and a process for comparing respective anomaly possibility indices ($B_{fd}$) of the code measurements and the carrier measurements with thresholds ($T_{fd}$), thus detecting the anomaly state of the satellites, wherein the anomaly state of the satellites is detected if each anomaly possibility index is equal to or greater than the corresponding threshold (where n is a natural number).

Furthermore, the method of determining the anomalous satellite in the multi-reference station environment method according to the present invention is characterized in that the code measurement residuals (g_PR) and the carrier measurement residuals (g_CP) are generated by the following equation:

$$g\_PR = \Psi - \{R + cT + Id + Td\}$$

$$g\_CP = (\Phi - \Phi_{init}) - \{(R + cT - Id + Td) - \Phi_{init}\}$$

where $\Psi$ and $\Phi$ denote code measurements and carrier measurements output from a receiver, $\Phi_{init}$ denotes an initial value of the carrier measurements output from the receiver, R denotes an actual distance between a satellite and the receiver, c denotes speed of light, T denotes an error in a satellite clock, Id denotes an ionospheric delay error, and Td denotes a tropospheric delay error.

Furthermore, the method of determining the anomalous satellite in the multi-reference station environment method according to the present invention is characterized in that the residual estimation operation vectors (M) are generated using the following equation:

$$M = [E(G^1) E(G^2) \ldots E(G^{n-1}) E(G^n)]^T$$

where T denotes a transposed matrix and E(x) denotes an average of vector x.

Furthermore, the method of determining the anomalous satellite in the multi-reference station environment method according to the present invention is characterized in that the parity space vectors (p) are generated using the following equation:

$$p = V \cdot M$$

where V denotes a matrix satisfying conditions of $V \cdot W = 0$ and $V \cdot V^T = I$, W denotes a vector of 1's of a (n×1) size, and I denotes a unit matrix having a (n−1)×(n−1) size.

Furthermore, the method of determining the anomalous satellite in the multi-reference station environment method according to the present invention is characterized in that the anomaly possibility indices ($B_{fd}$) are calculated using the following equation:

$$B_{fd} = p^T \cdot p$$

Furthermore, the method of determining the anomalous satellite in the multi-reference station environment method according to the present invention is characterized in that the fourth step includes a process for calculating anomaly identification indices ($B_{fi}$) using the following equation from the parity space vectors that use code measurement residuals for respective visible satellites at the third step, and a process for identifying an anomalous satellite from the anomaly identification indices, wherein the process for identifying the anomalous satellite is configured to detect j having a largest index among n anomaly identification indices, set a satellite group included in a j-th small group to normal satellites, and set a satellite, not included in the j-th small group, to an anomalous satellite, $$B_{fi}^j = v^j \cdot p\_PR / |v^j|$$

where $v^j$ denotes a j-th column vector of matrix V, and |x| denotes magnitude of column vector x.

Furthermore, the method of determining the anomalous satellite in the multi-reference station environment method according to the present invention is characterized in that the fifth step includes a process for dividing m reference station groups, each having (m−1) reference stations, into small reference station groups based on code measurement residuals (g_PR) of the anomalous satellite identified at the fourth step for the m reference stations, and calculating anomalous satellite residual deviations ($g\_std^k$) of respective small reference station groups, a process for individually calculating an anomaly cause determination index (g_var) using the following equation from the anomalous satellite residual deviations ($g\_std^k$), and a process for comparing the calculated anomaly cause determination index with a threshold (T_var), determining that the cause of the anomaly in the anomalous satellite is an orbital anomaly if the anomaly cause determination index is equal to or greater than the threshold (T_var), and determining that the cause of the anomaly in the anomalous satellite is a clock anomaly if the anomaly cause determination index is less than the threshold (T_var), $$g\_var = var(g\_std^k)$$

where m is a natural number of 3 or more, and var(x) denotes a variance of vector x.

An apparatus for determining an anomalous satellite in a multi-reference station environment according to the present invention is characterized in that it includes a satellite signal reception unit for receiving satellite signals including code measurements and carrier measurements, received from a plurality of satellites, through multiple reference stations, a reference station number determination unit for determining a number of reference stations communicating with the satellites, based on the satellite signals, an anomaly state detection unit for detecting presence or non-presence of an anomaly in the satellites from the code measurements and the carrier measurements of the satellite signals and generating an anomaly flag, an anomalous satellite identification unit for identifying an anomalous satellite, based on an anomaly state detected by the anomaly state detection unit, an anomalous satellite checking unit for checking whether anomalous satellites identified for respective reference stations correspond to an identical satellite, and an anomaly cause determination unit for determining a cause of an anomaly in the checked anomalous satellite.

Mode for Invention

Hereinafter, preferred embodiments of the present invention will be described in detail with reference to the attached drawings. In the following description, detailed descriptions of known functions and elements that may unnecessarily make the gist of the present invention obscure will be omitted.

The embodiments based on the concept of the present invention may be modified in various manners and may have various forms, so that specific embodiments are intended to be illustrated in the drawings and described in detail in the present specification or application. However, it should be understood that those embodiments are not intended to limit the embodiments based on the concept of the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Figure 1:
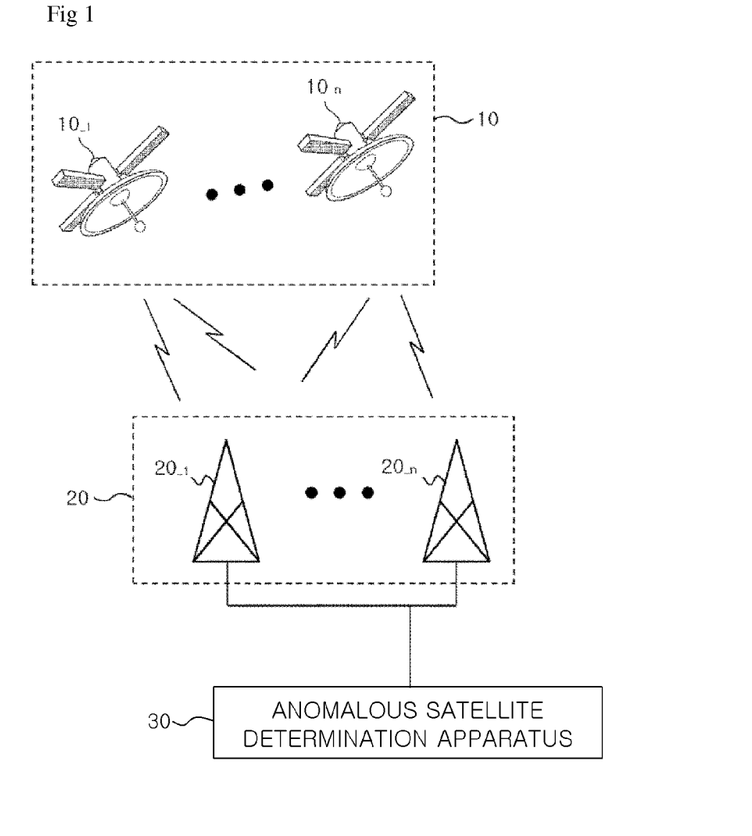
FIG. 1 is a diagram schematically showing a system for determining an anomalous satellite in a multi-reference station environment according to the present invention.

FIG. 1 is a diagram schematically showing a system for determining an anomalous satellite in a multi-reference station environment according to the present invention.

As shown in the drawing, a system 1 for determining an anomalous satellite may include a satellite group 10 composed of a plurality of satellites $10\_{_1}$ to $10\_{_n}$ for transmitting Global Positioning System (GPS) signals, a multi-reference station unit 20 composed of multiple reference stations $20\_{_1}$ to $20\_{_n}$ for receiving satellite signals transmitted from the respective satellites $10\_{_1}$ to $10\_{_n}$, and an anomalous satellite determination apparatus 30 for determining an anomalous satellite from the satellite signals received from the multi-reference station unit 20.

Figure 2:
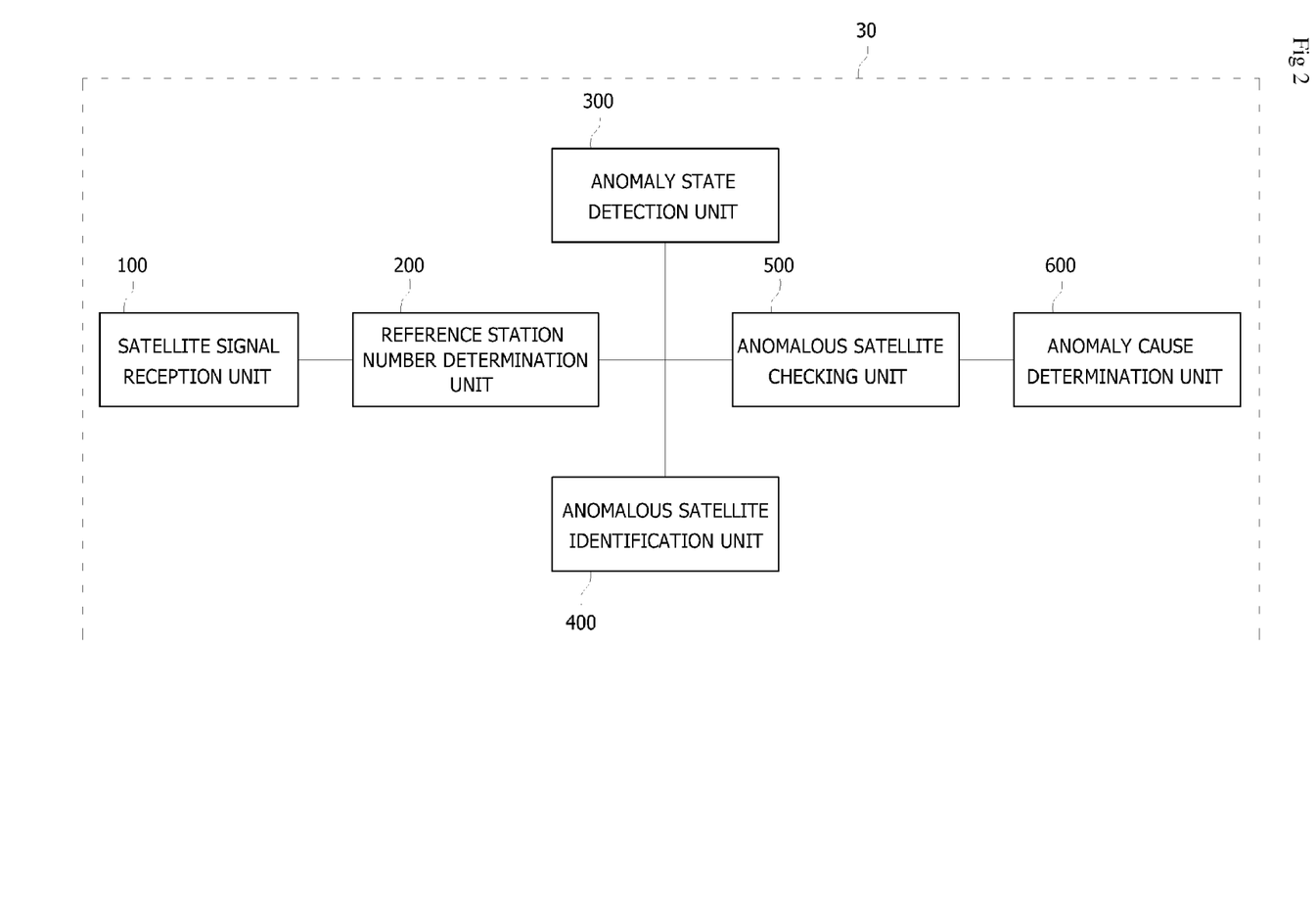
FIG. 2 is a block diagram showing a determination apparatus for determining an anomalous satellite in a multi-reference station environment according to the present invention.
Figure 3:
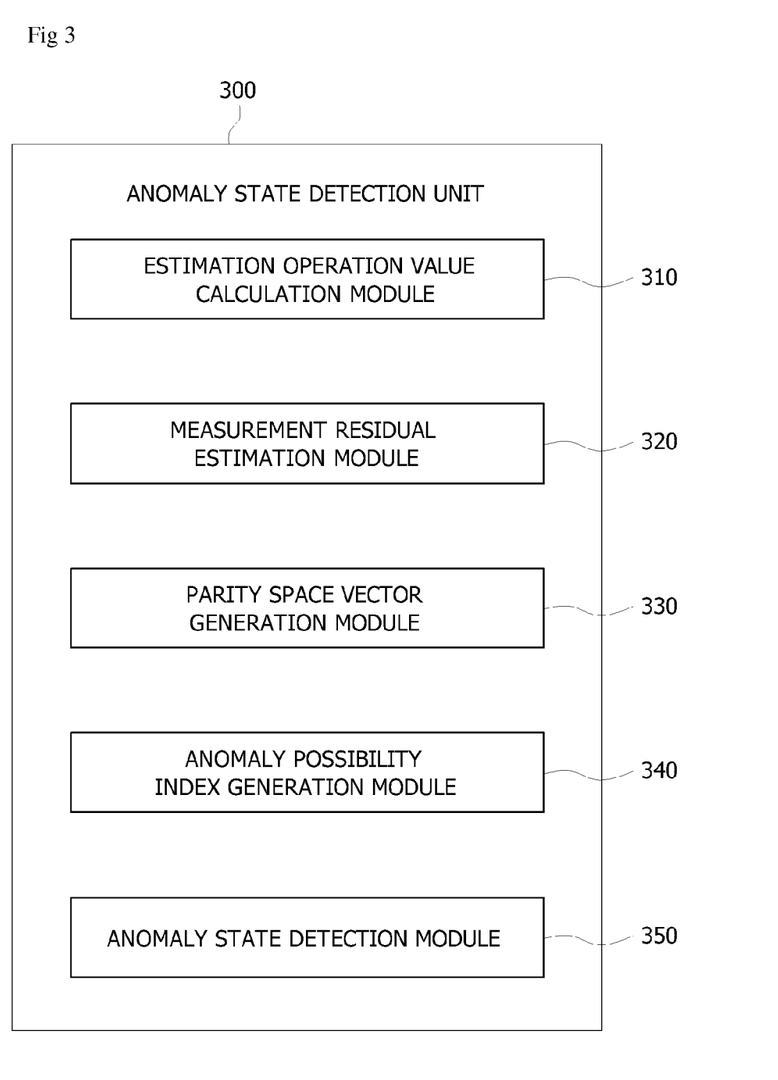
FIG. 3 is a block diagram showing the configuration of the anomaly state detection unit of the anomalous satellite determination apparatus according to the present invention.
Figure 4:
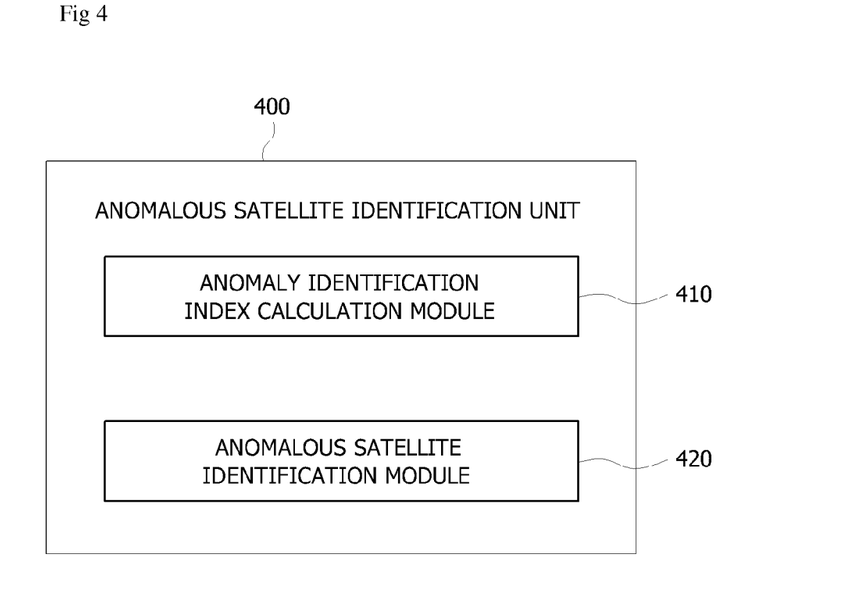
FIG. 4 is a block diagram showing the configuration of the anomalous satellite identification unit of the anomalous satellite determination apparatus according to the present invention.
Figure 5:
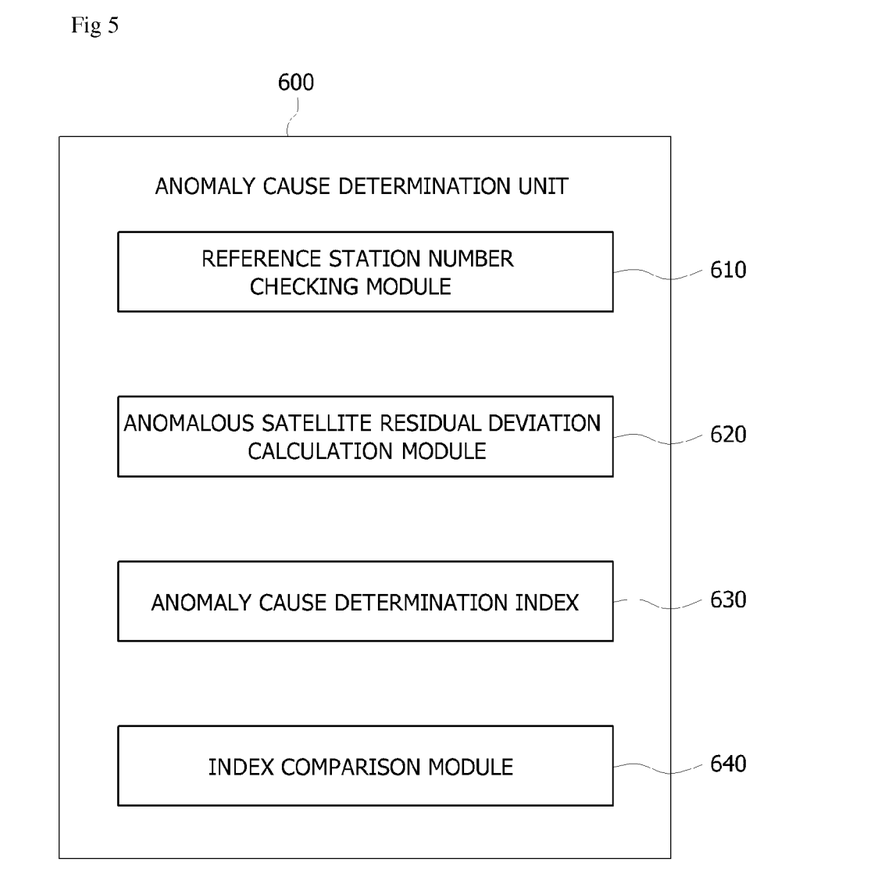
FIG. 5 is a block diagram showing the configuration of the anomaly cause determination unit of the anomalous satellite determination apparatus according to the present invention.

FIG. 2 is a block diagram showing a determination apparatus for determining an anomalous satellite in a multi-reference station environment according to the present invention, FIG. 3 is a block diagram showing the configuration of the anomaly state detection unit of the anomalous satellite determination apparatus according to the present invention, FIG. 4 is a block diagram showing the configuration of the anomalous satellite identification unit of the anomalous satellite determination apparatus according to the present invention, and FIG. 5 is a block diagram showing the configuration of the anomaly cause determination unit of the anomalous satellite determination apparatus according to the present invention.

As shown in the drawings, the anomalous satellite determination apparatus 30 may include a satellite signal reception unit 100, a reference station number determination unit 200, an anomaly state detection unit 300, an anomalous satellite identification unit 400, an anomalous satellite checking unit 500, and an anomaly cause determination unit 600.

The satellite signal reception unit 100 is provided with satellite signals including code measurements and carrier measurements individually received from the satellite group 10 composed of the plurality of satellites $10\_{_1}$ to $10\_{_n}$ via the multi-reference station unit 20. The reference station number determination unit 200 may determine the number of the reference stations $20\_{_1}$ to $20\_{_n}$ communicating with the respective satellites $10\_{_1}$ to $10\_{_n}$ based on the provided satellite signals.

The anomaly state detection unit 300 may detect the presence or non-presence of anomalies in the satellites $10\_{_1}$ to $10\_{_n}$ from the received code measurements and carrier measurements, and generate an anomaly flag, for example, 'flag 1'. The anomalous satellite identification unit 400 may identify an anomalous satellite among the plurality of satellites $10\_{_1}$ to $10\_{_n}$ based on the anomaly state detected by the anomaly state detection unit 300.

The anomalous satellite checking unit 500 checks whether anomalous satellites identified for respective reference stations $20\_{_1}$ to $20\_{_n}$ correspond to an identical satellite, and if it is not checked that they correspond to the identical satellite, creates an event log, for example, 'non-execution of anomalous satellite identification'. In contrast, if it is checked by the anomalous satellite checking unit 500 that the anomalous satellites correspond to the identical satellite, the anomaly cause determination unit 600 may determine the cause of the anomaly of the checked anomalous satellite, for example, an orbital anomaly or a clock anomaly.

As shown in FIG. 3, the anomaly state detection unit 200 includes an estimation operation value calculation module 310, a measurement residual estimation module 320, a parity space vector generation module 330, an anomaly possibility index generation module 340, and an anomaly state detection module 350.

The estimation operation value calculation module 310 may divide n satellite groups, each composed of (n–1) satellites, into small satellite groups (where n is a natural number), calculate the code measurement residuals g_PR and the carrier measurement residuals g_CP of respective small groups for code measurements and carrier measurements, and individually generate estimation operation vectors $G^i$.

The code measurement residuals g_PR and the carrier measurement residuals g_CP may be calculated using the following equation:

$$g\_PR = \Psi - \{R + cT + Id + Td\}$$

$$g\_CP = (\Phi - \Phi_{init}) - \{(R + cT - Id + Td) - \Phi_{init}\} \quad \text{[Equation 1]}$$

where $\Psi$ and $\Phi$ denote code measurements and carrier measurements output from a receiver, $\Phi_{init}$ denotes an initial value of the carrier measurements output from the receiver, R denotes an actual distance between a satellite and the receiver, c denotes the speed of light, T denotes an error in a satellite clock, Id denotes an ionospheric delay error, and Td denotes a tropospheric delay error.

Further, the estimation operation vector $G^i$ of each small group is configured such that, when visible satellites are, for example, PRN 1, PRN 2, PRN 4, PRN 6, PRN 7, and PRN 8, and code measurement residuals are used, n at this time is 6, and the code estimation operation vectors $G\_PR^i$ of six small groups may be configured by the following equation:

$$G\_PR^1 = [g\_PR_2 \, g\_PR_4 \, g\_PR_6 \, g\_PR_7 \, g\_PR_8]^T$$

$$G\_PR^2 = [g\_PR_1 \, g\_PR_4 \, g\_PR_6 \, g\_PR_7 \, g\_PR_8]^T$$

$$G\_PR^3 = [g\_PR_1 \, g\_PR_2 \, g\_PR_6 \, g\_PR_7 \, g\_PR_8]^T$$

$$G\_PR^4 = [g\_PR_1 \, g\_PR_2 \, g\_PR_4 \, g\_PR_7 \, g\_PR_8]^T$$

$$G\_PR^5 = [g\_PR_1 \, g\_PR_2 \, g\_PR_4 \, g\_PR_6 \, g\_PR_8]^T$$

$$G\_PR^6 = [g\_PR_1 \, g\_PR_2 \, g\_PR_4 \, g\_PR_6 \, g\_PR_7]^T \quad \text{[Equation 2]}$$

where T denotes a transposed matrix.

The measurement residual estimation module 320 may generate estimation operation vectors M for the measurement residuals using the following equation from the estimation operation vectors $G^i$:

$$M = [E(G^1) E(G^2) \ldots E(G^{n-1}) E(G^n)]^T \quad \text{[Equation 3]}$$

where E(x) denotes the average of vector x.

Further, the parity space vector generation module 330 may individually generate parity space vectors p using the following equation from the residual estimation operation vectors M generated by the measurement residual estimation module 320, $$p = V \cdot M \quad \text{[Equation 4]}$$

where V denotes a matrix satisfying conditions of $V \cdot W = 0$ and $V \cdot V^T = I$, W denotes a vector of 1's of a (n×1) size, and I denotes a unit matrix having a (n–1)×(n–1) size.

The anomaly possibility index generation module 340 may individually calculate anomaly possibility indices $B_{fd}$ using the generated parity space vectors p and the following equation:

$$B_{fd}=p^T \cdot p \quad \text{[Equation 5]}$$

Further, the anomaly state detection module 350 may compare each anomaly possibility index $B_{fd}$ with a threshold $T_{fd}$ and detect the presence or non-presence of the anomaly state of the corresponding satellite. In this case, the anomaly state detection module 350 may determine that the anomaly state of the satellite is present if the anomaly possibility index $B_{fd}$ is equal to or greater than the threshold (for example, $B_{fd\_PR} \geq T_{fd\_PR}$ and $B_{fd\_CP} \geq T_{fd\_CP}$).

As shown in FIG. 4, the anomalous satellite identification unit 400 may include an anomaly identification index calculation module 410 and an anomalous satellite identification module 420.

The anomaly identification index calculation module 410 may calculate anomaly identification indices $B_{fi}$ using the following equation based on the parity space vectors generated using the code measurement residuals for respective satellites by the anomaly state detection unit 300.

$$B_{fi}^j = v^j \cdot p\_PR/|v^j| \quad \text{[Equation 6]}$$

where $v^j$ denotes a j-th column vector of matrix v, and |x| denotes the magnitude of column vector x.

The anomalous satellite identification module 420, which identifies an anomalous satellite based on the anomaly identification indices, may detect j having a largest index among n anomaly identification indices, set a satellite group included in a j-th small group to normal satellites, and may set a satellite, not included in the j-th small group, to an anomalous satellite.

Further, the anomalous satellite checking unit 500 may check whether all of anomaly flags of the respective reference stations $20\_1$ to $20\_n$ are '1', check, based on the anomaly flags generated by the anomaly state detection unit 300, whether anomalous satellites identified for respective reference stations $20\_1$ to $20\_n$ correspond to an identical satellite, and if it is checked that the anomalous satellites do not correspond to an identical satellite, create an event log for the non-execution of identification of anomalous satellites.

As shown in FIG. 5, the anomaly cause determination unit 600 may include a reference station number checking module 610, an anomalous satellite residual deviation calculation module 620, an anomaly cause determination index calculation module 630, and an index comparison module 640.

The reference station number checking module 610 may check whether the number of reference stations is at least 3, and create an event log for the non-execution of determination of anomaly causes if the number of the reference stations is less than 3.

Further, in order to determine anomaly causes, the anomalous satellite residual deviation calculation module 620 may divide m reference station groups, each composed of (m−1) reference stations (where m is a natural number equal to or greater than 3), into small reference station groups on the basis of code measurement residuals g_PR of the anomalous satellite identified by the anomalous satellite identification unit 400 and the anomalous satellite checking unit 500 for the m reference stations, and may calculate the anomalous satellite residual deviations $g\_std^k$ of respective small reference station groups. For example, when the number of reference stations is 4, m at this time is 4, and the anomalous satellite residual deviations of the four small groups may be represented by the following equation:

$$g\_std^1 = std(g\_PR_2 g\_PR_3 g\_PR_4)$$

$$g\_std^2 = std(g\_PR_1 g\_PR_3 g\_PR_4)$$

$$g\_std^3 = std(g\_PR_1 g\_PR_2 g\_PR_4)$$

$$g\_std^4 = std(g\_PR_1 g\_PR_2 g\_PR_3) \quad \text{[Equation 7]}$$

The anomaly cause determination index calculation module 630 may generate an anomaly cause determination index g_var using the following equation from the anomalous satellite residual deviations $g\_std^k$.

$$g\_var = var(g\_std^k) \quad \text{[Equation 8]}$$

In this case, var(x) denotes the variance of vector x.

Therefore, the anomaly cause determination index g_var may be represented by the following equation from the above Equation (7):

$$g\_var = var(g\_std^1 g\_std^2 g\_std^3 g\_std^4)$$

The index comparison module 640 may compare the generated anomaly cause determination index g_var with a threshold T_var, determine that the anomaly cause of the anomalous satellite is an orbital anomaly if the anomaly cause determination index is equal to or greater than the threshold T_var, and determine that the anomaly cause of the anomalous satellite is a clock anomaly if the anomaly cause determination index is less than the threshold T_var.

Figure 6:
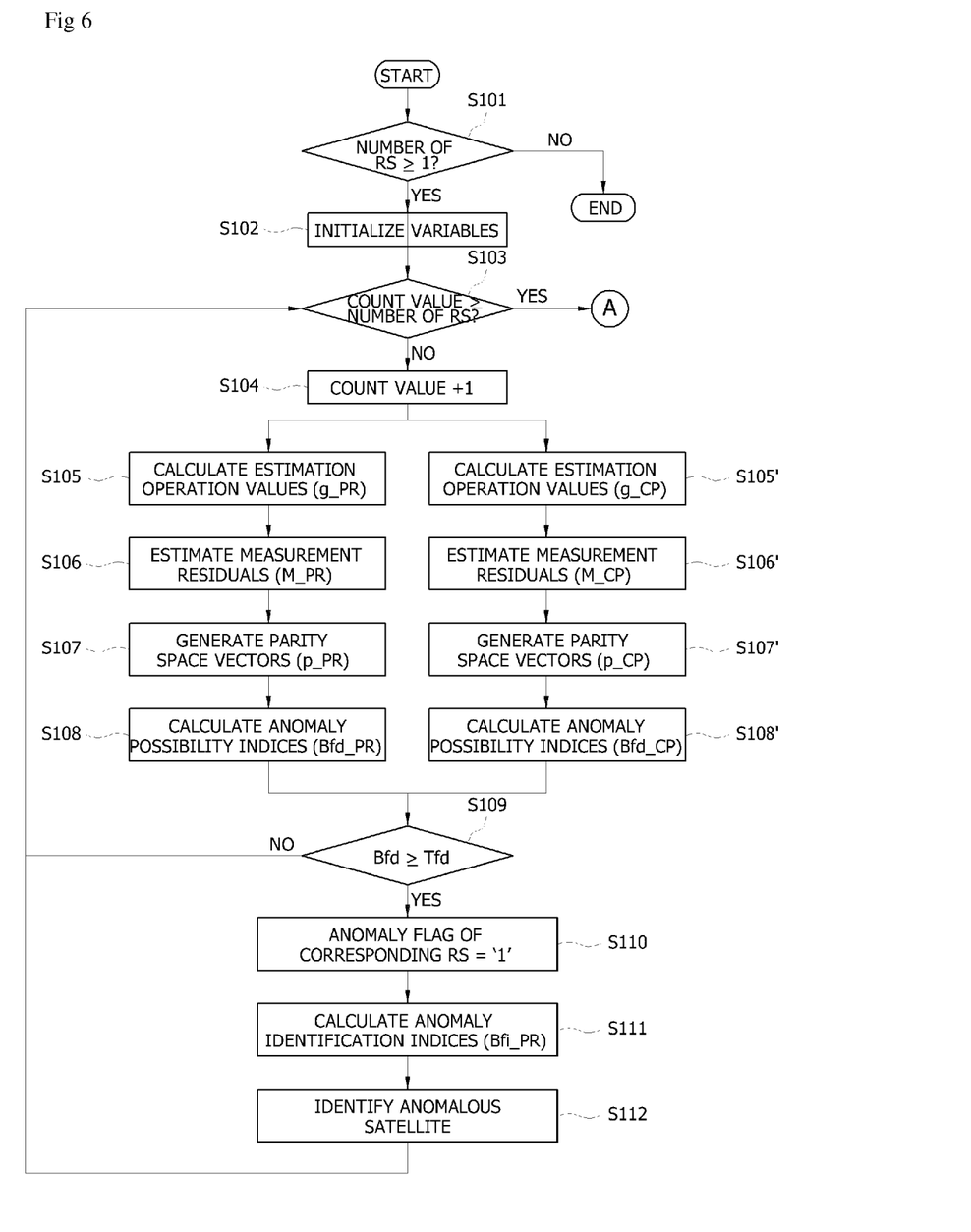
FIG. 6 is a flowchart showing an anomalous satellite identification method in a method of determining an anomalous satellite in a multi-reference station environment according to the present invention.
Figure 7:
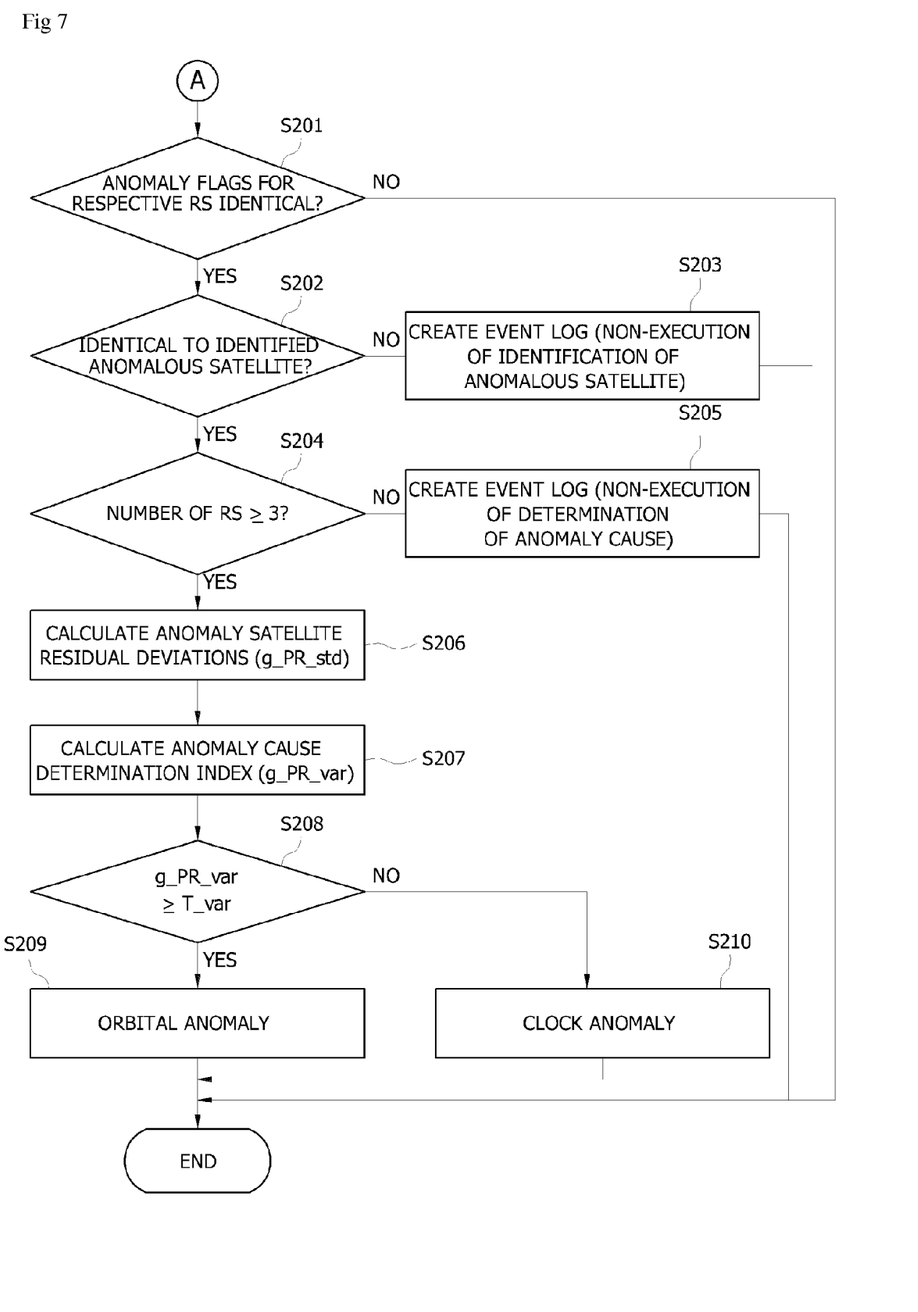
FIG. 7 is a flowchart showing a method of determining the cause of an anomaly in an identified anomalous satellite according to the present invention.

FIG. 6 is a flowchart showing an anomalous satellite identification method in a method of determining an anomalous satellite in a multi-reference station environment according to the present invention, and FIG. 7 is a flowchart showing a method of determining the anomaly cause of an identified anomalous satellite according to the present invention.

Referring to FIGS. 1 to 7, in the method of determining an anomalous satellite in a multi-reference station environment, the satellite signal reception unit 100 receives satellite signals including code measurements and carrier measurements from multiple reference stations $20\_1$ to $20\_n$, which communicate with a plurality of satellites $10\_1$ to $10\_n$, respectively (S101). The reference station number determination unit 200 checks the number of the reference stations RS communicating with the respective satellites $10\_1$ to $10\_n$ from the satellite signals (S102), determines that there is no reference station communicating with a satellite if the number of the reference stations is less than 1, and terminates the determination of an anomalous satellite.

Further, the reference station number determination unit 200 initializes variables, such as frequency, the number of the reference stations, and the number of visible satellites (to '0' or actual values) (S103), compares the number of processes required to identify an anomalous satellite, that is, a count value, with the checked number of the reference stations (S104), proceeds to step A (determination of anomaly causes) if the count value is equal to or greater than the number of the reference stations, proceeds to the step S105 of increasing the current count value by +1 if the count value is less than the number of the reference stations, and thereafter performs a process for determining whether an anomalous satellite is present using the code measurements and the carrier measurements.

The anomaly state detection unit 300 calculates code measurement residuals g_PR and carrier measurement residuals g_CP from the code measurements and the carrier measurements by using the above Equation (1) (S106 and S106'), divides n satellite groups, each composed of (n−1) satellites, into small satellite groups (where n is a natural number), and individually generates estimation operation vectors $G^i$ from the code measurement residuals g_PR and the carrier measurement residuals g_CP of the respective small groups (S107, S107').

By using the above Equation (3) from the generated estimation operation vectors $G^i$, estimation operation vectors for measurement residuals M_PR and M_CP are respectively generated (S108, S108'), and parity space vectors p_PR and p_CP are respectively generated using the above Equation (4) from the generated residual estimation operation vectors M_PR and M_CP (S109, S109'). The parity space vectors p_PR and p_CP may be applied to Equation (5) and then anomaly possibility indices $B_{fd\_}PR$ and $B_{fd\_}CP$ may be calculated (S110, S110').

Thereafter, the anomaly possibility indices $B_{fd\_}PR$ and $B_{fd\_}CP$ are compared with the thresholds $T_{fd\_}PR$ and $T_{fd\_}CP$, respectively (S111), and an anomaly flag of '1' is set for the corresponding reference station if the corresponding anomaly possibility index is equal to or greater than the threshold (S112), and thus it may be determined whether the anomaly state of each satellite is present.

The anomalous satellite identification unit 400 identifies an anomalous satellite from the anomaly state of the satellites detected by the anomaly state detection unit 300, calculates anomaly identification indices $B_{fi\_}PR$ using the above Equation (6) from the parity space vectors which use the code measurement residuals for respective visible satellites (S112), detects j having a largest index among n anomaly identification indices, sets a satellite group included in a j-th small group to normal satellites, and sets a satellite, not included in the j-th small group, to an anomalous satellite, thus identifies the anomalous satellite (S113).

Thereafter, the process proceeds to step S104 where steps S105 to S103 may be continuously repeated a number of times identical to the checked number of the reference stations.

If it is checked that the count value at step S104 is the checked number of the reference stations, an anomaly cause determination process A is performed. As shown in FIG. 7, the anomalous satellite checking unit 500 checks whether all of anomaly flags for respective reference stations $20_{-1}$ to $20_{-n}$ are '1' (S201), and terminates the process if they are not identical to '1'. If the anomaly flags are identical to '1', the anomalous satellite checking unit 500 checks whether anomalous satellites identified for respective reference stations $20_{-1}$ to $20_{-n}$ correspond to an identical satellite (S202), creates an event log for the non-execution of identification of anomalous satellites (S203) and terminates the process if the anomalous satellites do not correspond to an identical satellite, and determines whether the checked number of the reference stations is at least 3 if the anomalous satellites correspond to the identical satellite (S204). If the number of the reference stations is less than 3, an event log for the non-execution of determination of anomaly causes is created (S205), and the process is terminated.

In contrast, if it is determined that the number of the reference stations is at least 3, the anomaly cause determination unit 600 may divide reference stations into m (where m is a natural number of 3 or more) small groups, each composed of (m−1) reference station groups, based on the code measurement residuals g_PR of the anomalous satellite for the m reference stations, and calculate the anomalous satellite residual deviations g_PR_std of the respective small groups (S206).

Thereafter, by using Equation (8) from the calculated anomalous satellite residual deviations g_PR_std, an anomaly cause determination index g_PR_var is calculated (S207). The anomaly cause determination unit 600 compares the calculated anomaly cause determination index g_PR_var with a threshold T_var (S208), determines that the anomaly cause of the anomalous satellite is an orbital anomaly if the anomaly cause determination index g_PR_var is equal to or greater than the threshold T_var (S209), and determines that the anomaly cause is a clock anomaly if the anomaly cause determination index g_PR_var is less than the threshold T_var (S210).

As described above, via the processing of determination of anomaly causes, it may be determined whether the cause of anomalies is a clock anomaly or an orbital anomaly which is the most representative cause of an anomalous satellite. The clock anomaly occurring in a specific satellite may act as a common error factor in all reference stations, but the orbital anomaly may differ between reference stations, and such a difference may definitely appear as a distance between the reference stations is longer. Therefore, in accordance with the present invention, when an anomalous satellite appears, a warning against such a satellite may be provided, and a service may be continuously provided in an environment in which the cause of anomalies is removed, thus improving the availability of the service.

Although the present invention have been described with reference to the embodiments illustrated in the drawings, these embodiments are merely exemplary, and those skilled in the art will appreciate that various modifications and other equivalent embodiments thereof are possible from those embodiments. Therefore, the technical spirit of the present invention should be defined by the technical spirit of the accompanying claims.

INDUSTRIAL APPLICABILITY

As described above, a method of determining an anomalous satellite in a multi-reference station environment and a determination apparatus using the method according to the present invention may detect the anomaly state of a satellite in the multi-reference station environment, identify an anomalous satellite, and determine the cause of the anomaly in the anomalous satellite, so that a service may be continuously provided in an environment in which the cause of the anomaly is removed, thus improving availability and continuity, and enhancing an integrity monitoring function.

The invention claimed is:
1. A method of determining an anomalous satellite in a multi-reference station environment, comprising:
   a first step of a satellite signal reception unit individually receiving satellite signals including code measurements and carrier measurements from one or more reference stations respectively communicating with a plurality of satellites;
   a second step of a reference station number determination unit checking a number of reference stations communicating with the plurality of satellites, based on the satellite signals;
   a third step of an anomaly state detection unit detecting presence or non-presence of an anomaly state of the satellites, based on the code measurements and the carrier measurements of the satellite signals; and
   a fourth step of an anomalous satellite identification unit identifying an anomalous satellite from the anomaly state of the satellites detected at the third step, wherein the third step and the fourth step are sequentially repeated a number of times identical to the number of the reference stations checked at the second step, wherein the third step comprises:

a process of dividing n satellite groups, each having (n−1) satellites, into small satellite groups, and generating estimation operation vectors ($G^i$) for code measurement residuals (g_PR) and carrier measurement residuals (g_CP) of the respective small satellite groups;

a process of individually generating estimation operation vectors (M) for measurement residuals from the estimation operation vectors ($G^i$);

a process for individually generating parity space vectors (p) from the residual estimation operation vectors (M);

a process for individually calculating anomaly possibility indices ($B_{fd}$) using the parity space vectors; and a process for comparing respective anomaly possibility indices ($B_{fd}$) of the code measurements and the carrier measurements with thresholds ($T_{fd}$), thus detecting the anomaly state of the satellites, wherein the anomaly state of the satellites is detected if each anomaly possibility index is equal to or greater than the corresponding threshold (where n is a natural number).

2. The method of claim 1, further comprising, if the number of the reference stations checked at the second step is at least 3, a fifth step of an anomaly cause determination unit determining a cause of an anomaly in the anomalous satellite identified at the fourth step.

3. The method of claim 1, wherein the code measurement residuals (g_PR) and the carrier measurement residuals (g_CP) are generated by the following equation:

$$g\_PR = \Psi - \{R + cT + Id + Td\}$$

$$g\_CP = (\Phi - \Phi_{init}) - \{(R + cT - Id + Td) - \Phi_{init}\}$$

where $\Psi$ and $\Phi$ denote code measurements and carrier measurements output from a receiver, $\Phi_{init}$ denotes an initial value of the carrier measurements output from the receiver, R denotes an actual distance between a satellite and the receiver, c denotes speed of light, T denotes an error in a satellite clock, Id denotes an ionospheric delay error, and Td denotes a tropospheric delay error.

4. The method of claim 1, wherein the residual estimation operation vectors (M) are generated using the following equation:

$$M = [E(G^1) E(G^2) \ldots E(G^{n-1}) E(G^n)]^T$$

where T denotes a transposed matrix and E(x) denotes an average of vector x.

5. The method of claim 1, wherein the parity space vectors (p) are generated using the following equation:

$$p = V \cdot M$$

where V denotes a matrix satisfying conditions of $V \cdot W = 0$ and $V \cdot V^T = I$, W denotes a vector of 1's of a (n×1) size, and I denotes a unit matrix having a (n−1)×(n−1) size.

6. The method of claim 1, wherein the anomaly possibility indices ($B_{fd}$) are calculated using the following equation:

$$B_{fd} = p^T \cdot p.$$

7. The method of claim 1, wherein the fourth step comprises:

a process for calculating anomaly identification indices ($B_{fi}$) using the following equation from the parity space vectors that use code measurement residuals for respective visible satellites at the third step; and a process for identifying an anomalous satellite from the anomaly identification indices, wherein the process for identifying the anomalous satellite is configured to detect j having a largest index among n anomaly identification indices, set a satellite group included in a j-th small group to normal satellites, and set a satellite, not included in the j-th small group, to an anomalous satellite, $$B_{fi}^j = v^j \cdot p\_PR / |v^j|$$

where $v^j$ denotes a j-th column vector of matrix V, and |x| denotes magnitude of column vector x.

8. The method of claim 2, wherein the fifth step comprises:

a process for dividing m reference station groups, each having (m−1) reference stations, into small reference station groups based on code measurement residuals (g_PR) of the anomalous satellite identified at the fourth step for the m reference stations, and calculating anomalous satellite residual deviations ($g\_std^k$) of respective small reference station groups;

a process for individually calculating an anomaly cause determination index (g_var) using the following equation from the anomalous satellite residual deviations ($g\_std^k$); and a process for comparing the calculated anomaly cause determination index with a threshold (T_var), determining that the cause of the anomaly in the anomalous satellite is an orbital anomaly if the anomaly cause determination index is equal to or greater than the threshold (T_var), and determining that the cause of the anomaly in the anomalous satellite is a clock anomaly if the anomaly cause determination index is less than the threshold (T_var), $$g\_var = var(g\_std^k)$$

where m is a natural number of 3 or more, and var(x) denotes a variance of vector x.

9. An apparatus for determining an anomalous satellite in a multi-reference station environment, comprising:

a satellite signal reception unit for receiving satellite signals including code measurements and carrier measurements, received from a plurality of satellites, through multiple reference stations;

a reference station number determination unit for determining a number of reference stations communicating with the satellites, based on the satellite signals;

an anomaly state detection unit for detecting presence or non-presence of an anomaly in the satellites from the code measurements and the carrier measurements of the satellite signals and generating an anomaly flag;

an anomalous satellite identification unit for identifying an anomalous satellite, based on an anomaly state detected by the anomaly state detection unit;

an anomalous satellite checking unit for checking whether anomalous satellites identified for respective reference stations correspond to an identical satellite; and an anomaly cause determination unit for determining a cause of an anomaly in the checked anomalous satellite, wherein the anomaly state detection unit comprises:

an estimation operation value calculation module for dividing n satellite groups, each having (n−1) satellites, into small satellite groups, calculating code measurement residuals (g_PR) and carrier measurement residuals (g_CP) of respective small satellite groups for code measurements and carrier measurements, and then individually generating estimation operation vectors ($G^i$);

a measurement residual estimation module for individually generating estimation operation vectors (M) for measurement residuals from the estimation operation vectors ($G^i$);

a parity space vector generation module for individually generating parity space vectors (p) from the residual estimation operation vectors (M);

an anomaly possibility index generation module for individually calculating anomaly possibility indices ($B_{fd}$) using the parity space vectors; and an anomaly state detection module for comparing the respective anomaly possibility indices ($B_{fd}$) with thresholds ($T_{fd}$), and detecting presence or non-presence of an anomaly state of the satellites, wherein the anomaly state detection module is configured to determine an anomaly state if each anomaly possibility index is equal to or greater than the corresponding threshold.

10. The apparatus of claim 9, wherein the anomaly cause determination unit determines the cause of the anomaly if a number of the reference stations determined by the reference station number determination unit is at least 3.

11. The apparatus of claim 9, wherein the estimation operation value calculation module generates the code measurement residuals (g_PR) and the carrier measurement residuals (g_CP) by the following equation:

$$g\_PR = \Psi - \{R + cT + Id + Td\}$$

$$g\_CP = (\Phi - \Phi_{init}) - \{(R + cT - Id + Td) - \Phi_{init}\}$$

where $\Psi$ and $\Phi$ denote code measurements and carrier measurements output from a receiver, $\Phi_{init}$ denotes an initial value of the carrier measurements output from the receiver, R denotes an actual distance between a satellite and the receiver, c denotes speed of light, T denotes an error in a satellite clock, Id denotes an ionospheric delay error, and Td denotes a tropospheric delay error.

12. The apparatus of claim 9, wherein the measurement residual estimation module generates the residual estimation operation vectors (M) using the following equation:

$$M = [E(G^1) E(G^2) \ldots E(G^{n-1}) E(G^n)]^T$$

where T denotes a transposed matrix and E(x) denotes an average of vector x.

13. The apparatus of claim 9, wherein the parity space vector generation module generates the parity space vectors (p) using the following equation:

$$p = V \cdot M$$

where V denotes a matrix satisfying conditions of $V \cdot W = 0$ and $V \cdot V^T = I$, W denotes a vector of 1's of a (n×1) size, and I denotes a unit matrix having a (n−1)×(n−1) size.

14. The apparatus of claim 9, wherein the anomaly possibility index generation module calculates the anomaly possibility indices ($B_{fd}$) using the following equation:

$$B_{fd} = p^T \cdot p.$$

15. The apparatus of claim 9, wherein the anomalous satellite identification unit comprises:

an anomaly identification index calculation module for calculating anomaly identification indices ($B_{fi}$) using the following equation from the parity space vectors generated by the anomaly state detection unit using the code measurement residuals for respective satellites; and an anomalous satellite identification module for identifying an anomalous satellite from the anomaly identification indices, wherein the anomalous satellite identification module is configured to detect j having a largest index among n anomaly identification indices, set a satellite group included in a j-th small group to normal satellites, and set a satellite, not included in the j-th small group, to an anomalous satellite, $$B_{fi}^j = v^j \cdot p\_PR / |v^j|$$

where $v^j$ denotes a j-th column vector of matrix V, and |x| denotes magnitude of column vector x.

16. The apparatus of claim 9, wherein the anomalous satellite checking unit checks whether anomalous satellites identified by respective reference stations based on the anomaly flag generated by the anomaly state detection unit correspond to an identical satellite.

17. The apparatus of claim 9, wherein the anomaly cause determination unit comprises:

an anomalous satellite residual deviation calculation module for dividing m reference station groups, each having (m−1) reference stations, into small reference station groups based on code measurement residuals (g_PR) of the anomalous satellite identified by the anomalous satellite checking unit and the anomalous satellite identification unit for the m reference stations, and calculating anomalous satellite residual deviations (g_std$^k$) of respective small reference station groups;

an anomaly cause determination index calculation module for calculating an anomaly cause determination index (g_var) from the anomalous satellite residual deviations (g_std$^k$); and an index comparison module for comparing the anomaly cause determination index with a threshold (T_var), determining that the cause of the anomaly in the anomalous satellite is an orbital anomaly if the anomaly cause determination index is equal to or greater than the threshold (T_var), and determining that the cause of the anomaly in the anomalous satellite is a clock anomaly if the anomaly cause determination index is less than the threshold (T_var).

18. The apparatus of claim 17, wherein the anomaly cause determination index calculation module calculates the anomaly cause determination index using the following equation:

$$g\_var = var(g\_std^k)$$

where var(x) denotes a variance of vector x.

19. The apparatus of claim 17, wherein the anomaly cause determination unit comprises a reference station number checking module for checking whether a number of the reference stations is at least 3, and creates an event log for non-execution of determination of anomaly causes if the number of the reference stations is less than 3.

* * * * *